July 12, 1949.  C. B. H. FELDMAN ET AL  2,476,032
DOPPLER EFFECT SPEED AND DRIFT INDICATING SYSTEM
Filed March 8, 1944  2 Sheets-Sheet 1

INVENTORS: C.B.H. FELDMAN
J.W. McRAE
BY
H.O. Wright
ATTORNEY

July 12, 1949.   C. B. H. FELDMAN ET AL   2,476,032
DOPPLER EFFECT SPEED AND DRIFT INDICATING SYSTEM
Filed March 8, 1944   2 Sheets-Sheet 2
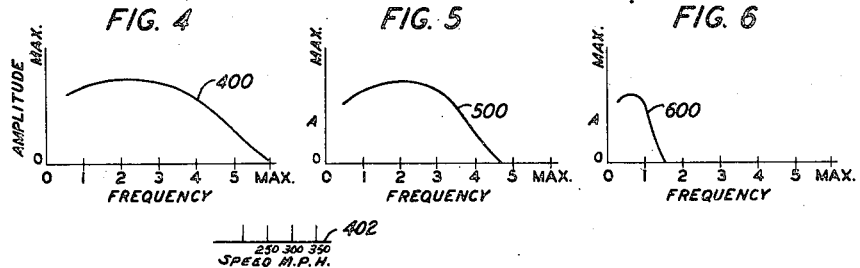
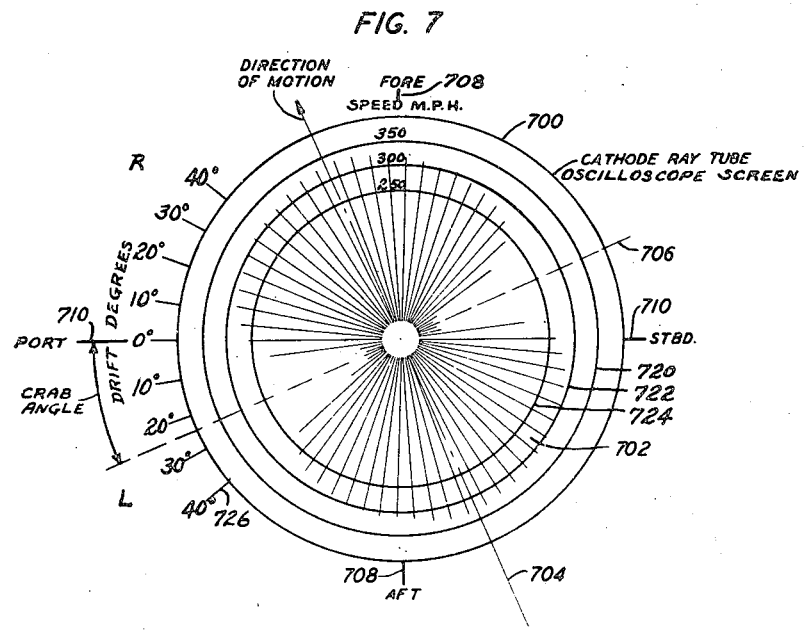
INVENTORS: C.B.H. FELDMAN
J.W. MC RAE
BY
ATTORNEY

UNITED STATES PATENT OFFICE 2,476,032

DOPPLER EFFECT SPEED AND DRIFT INDICATING SYSTEM

Carl B. H. Feldman, Rumson, N. J., and James W. McRae, Alexandria, Va., assignors to Bell Telephone Laboratories, Incorporated, New York, N. Y., a corporation of New York Application March 8, 1944, Serial No. 525,554

3 Claims. (Cl. 343—8)

This invention relates to improved methods and apparatus for determining the speed and drift of aircraft with respect to the earth's surface. More particularly it relates to improved methods and apparatus for determining ground speed and drift of aircraft by use of the Doppler effect.

The arrangements of the present invention represent an extension of the use of principles disclosed in United States Patent 2,223,224, issued November 26, 1940, to R. C. Newhouse. As explained in this patent, if a beam of energy of a particular predetermined frequency, preferably of ultra-high frequency radio wave energy (though any form of wave energy can obviously be employed), be radiated from an aircraft to strike the surface of the earth obliquely, a part of it will be returned to the aircraft by the phenomenon known as "diffuse reflection." Furthermore, if the aircraft is approaching, or receding from, the point of reflection, it is well known that because of the "Doppler effect" the apparent frequency of the energy received on the aircraft will be greater, or less, than the frequency of the energy emitted therefrom, respectively. The frequency difference is further proportional to the instantaneous rate of change of the distance between the aircraft and the point at which reflection occurs. As explained in connection with Equation 2 of the above-mentioned Newhouse patent, the speed or velocity of the aircraft relative to any particular ray of the projected beam is a function (cosine) of the angle of that ray with respect to the direction of motion of the aircraft. Thus it is apparent that the frequency difference provides an index of the aircraft's speed with respect to the direction of the point of reflection.

In actual radio (or other forms of wave energy) systems, a sharp "pencil" or "single ray" beam is not readily obtained. In fact, with directive radio antenna systems of reasonably small bulk a maximum beam width in the order of 30 degrees is not unusual. Therefore, assuming, by way of example, that the energy beam of a particular predetermined frequency is being projected ahead of the craft at the same azimuthal angle as that of the direction of motion of the craft, instead of the energy striking a single point on the earth it will be spread over an elliptical area. The speed of approach of the craft with respect to the several portions of this area will, obviously, differ somewhat because of the different vertical angles of the several rays of the beam projected from the craft with respect to the direction of motion of the craft. It is therefore also obvious that when the reflections of all the rays are received on the aircraft any particular reflected ray will have an apparent frequency, as a result of the well-known Doppler effect, which depends upon the vertical angle at which the particular ray was projected from the craft. That is to say that a ray projected at the smallest vertical angle (and thus reflected from the furtherest point on the above-mentioned elliptical area) will have an apparent frequency substantially greater than that of the ray projected at the largest vertical angle. (The latter ray would, obviously, be reflected from the nearest point on the elliptical area.) Rays projected at vertical angles intermediate the above-described maximum and minimum angles would, of course, give rise to reflected rays having intermediate values of apparent frequency the apparent frequency of the reflection of any particular ray being dependent upon the cosine of the vertical angle at which said ray was projected. For the purposes of the present invention it is obvious that a fan-shaped beam having its width in the vertical plane and a reasonably narrow horizontal, or azimuth, spread, to increase definition with respect to azimuth angle variations, is desirable, since such a beam will strike an elliptical area having a long major axis along the azimuthal direction of the beam and a relatively short minor axis, normal to the major axis. The shaping of horn antennas to obtain various types of fan-shaped beams is discussed in detail in United States Patent 2,255,042, issued September 9, 1941, to W. L. Barrow. As pointed out in Barrow's patent the so-called sectoral horn, three species of which are illustrated in Figs. 1, 3 and 4 of the patent, is readily proportioned, as described in detail in the patent, to provide a narrow (or highly directive) beam in the horizontal (X—Z) plane. In the vertical (X—Y) plane, the sectoral horn is also readily proportioned, as illustrated by the curves of Fig. 11 and discussed at page 6, column 1, starting at line 27, of the patent to provide a broad beam. It is further specifically pointed out in Barrow's patent at page 6, column 1, starting at line 4, "By appropriate dimensioning the beam may be made fan-shaped. . . ."

As explained in the above-mentioned patent to R. C. Newhouse, when the energy beam has the same horizontal or azimuthal direction as that of the actual motion of the craft, assuming the speed of the craft is maintained substantially constant as the beam direction is changed, the apparent frequency differences will be of maxin value. Also when the energy beam is directed precisely at right angles with respect to actual direction of motion of the craft, the arent frequency difference would be zero for ngle ray beam and in the usual case, with an reciable though small lateral beam spread, apparent frequency differences will be of imum value.

the reflected energy is combined with a small ount of the radiated energy and the combined rgies are detected, beat-note frequencies representing the frequency differences will be obtained. The frequency spectrum, or distribution, hese frequency difference beat-notes will vary a the speed of the aircraft and with both the izontal and vertical angles at which the energy m is radiated with respect to the actual direction of motion of the aircraft. This follows ectly from Equation 8 of the above-mentioned ent to Newhouse.

a general, a more extensive frequency spectrum of beat-note frequencies and particularly e of the higher beat-note frequencies will be ained when the beam is directed at the same nuthal angle as the axis of actual motion of craft, and the spectrum will contract and the her beat-note frequencies will disappear progressively as the azimuthal angle of the beam is ned toward the perpendicular to the axis of ual motion, becoming a minimum when the nuthal direction of the beam is perpendicular reto.

The next step, then, is to analyze the frequency tribution of beat-note frequencies for various muth angles of the exploratory beam. The muthal position for which the most extensive quency spectrum is obtained is indicative of a azimuthal direction of actual motion of the craft and the maximum frequencies of the at-notes obtained for this beam position are index of the actual speeds of the craft with pect to the earth. Similarly, the azimuthal for ich the least extensive frequency spectrum is ained indicates the line of the perpendicular the direction of actual motion of the craft and an index of the drift or "crab angle" of the craft with respect to its heading.

The principal objects of the invention are to ovide improved methods and systems for obning speed and drift indications for aircraft. her objects will become apparent during the arse of the following description and in the pended claims.

The application of the principles of the invention will be more readily understood from the deled description of particular illustrative emdiments given hereinafter, in conjunction with e accompanying drawings, in which:

Fig. 1 indicates in block schematic diagram rm one type of system for practicing the principles of the present invention, the system being apted to be mounted on an aircraft;

Fig. 2 indicates the synchronism of the oscilloope sweep and the frequency variation of the ating oscillator;

Figs. 4, 5 and 6 represent the change in the at-note frequency spectrum with change in imuth angle of the exploratory beam of the stem of Fig. 1 as shown upon an oscilloscope lth linear sweep; and Fig. 7 shows a polar diagram of the beat-note equency spectrum variation for the complete rotation in azimuth of the exploratory beam of the system of Fig. 1.

Figure 1:
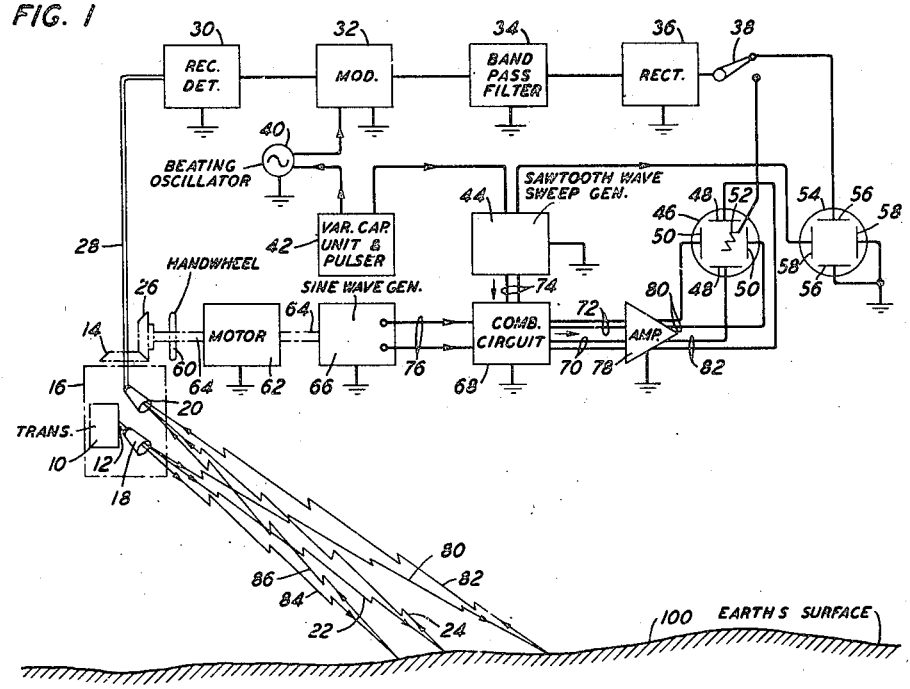
Figure 2:
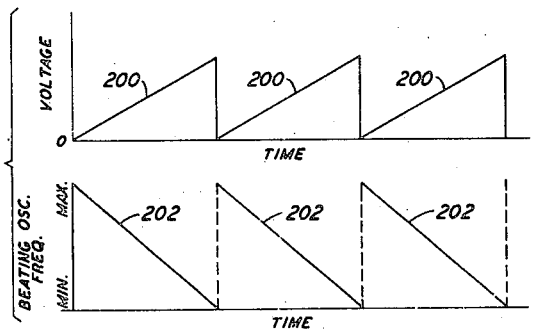

In more detail in Fig. 1, the apparatus shown is assumed to be mounted on an aircraft. The ultra-high frequency transmitter 10 energizes horn antenna 18 through connecting transmission line 12, to radiate and project a beam of radio energy of a particular predetermined frequency, represented in part by rays 22, 80 and 84, so as to strike the surface of the earth at an oblique angle. By the phenomena of "diffuse reflection" (and by direct reflection where irregularities of the surface of the earth fortuitously present normal surfaces to the oblique rays of the beam) some of the radiated energy, represented in part by rays 24, 82 and 86, will be reflected back to receiving horn antenna 20 and will be conducted by transmission line 28 to receiving detector 30. By normal "crosstalk" between horns 18 and 20 a small amount of the energy being radiated will also be received in horn 20 and when combined with the reflected energy and detected in receiver-detector 30, a spectrum of beat-note frequencies, arising by virtue of the Doppler effect upon the reflected energy, will be obtained, which will vary in character as described above with changes in the azimuth angle of the projected beam with respect to the actual direction of motion of the craft relative to the earth. Should the normal "crosstalk" or coupling between the antenna horns be insufficient, small reflecting members as shown in Fig. 2 of United States Patent 2,193,361, issued March 12, 1940, to C. W. Rice, or the equivalent, can be added to increase the coupling.

The frequency spectrum of beat-notes for each antenna direction can be analyzed and examined by the familiar method of beating the spectrum with an oscillator, the frequency of which is varied over a range such that at some frequency within the oscillator range each frequency of the beat-note spectrum will produce a particular frequency which will pass through a narrow band-pass filter and the over-all distribution may be observed on a cathode ray oscilloscope the ray of which is swept horizontally in synchronism with the variation of the beating oscillator frequency as represented diagrammatically in Fig. 2, the ray being deflected vertically by passage of energy through the band-pass filter. Alternatively, the method of frequency analysis described in detail in United States Patent 2,084,760, issued June 22, 1937, to H. H. Beverage can, obviously, be employed. This patent, incidentally, discloses also the use of a cathode ray indicator to display the relative amplitudes of the several frequencies of the particular spectrum being analyzed in substantially the manner described above, though the type of frequency spectrum being analyzed is of a distinctly different amplitude distribution.

The variation of frequency distribution with the angle of the horns 18, 20 of Fig 1 is illustrated by curves 400, 500 and 600 of Figs. 4, 5 and 6 respectively, which are representative of the indications which will be provided by the system of Fig. 1 on oscilloscope 54 when switch 38 is in its upper position.

Figure 3:
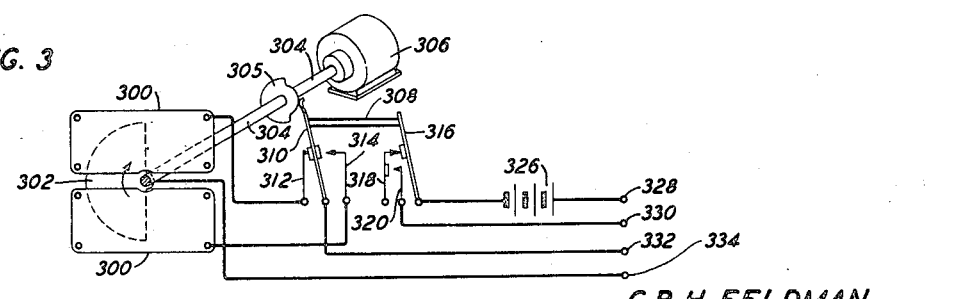
Fig. 3 shows one form of variable rotary conmser and pulsing unit suitable for use with the stem of Fig. 1.

The spectrum of beat-note frequencies obtained in receiver-detector 30 is combined in modulator 32 with the output of oscillator 40, the frequency of which oscillator is varied linearly in synchronism with the saw-tooth sweep wave of sweep generator 44 as indicated by curves 200 and 202 of Fig. 2. The frequency of the oscillator is caused to vary by virtue of the variation of the capacity of the variable rotary condenser of unit 42. The latter unit includes a cam operated spring switch pulsing mechanism which provides a pulse for actuating the sweep generator 44 as each frequency sweep starts. A suitable form for the unit 42 is shown in Fig. 3 and will be described in detail in connection therewith.

Filter 34 is a band filter passing a very narrow band of frequencies and the frequency range of oscillator 40 is such that each frequency of the beat-note frequency spectrum will, once each cycle, produce a modulation frequency in modulator 32 that will pass through filter 34.

The output of filter 34 is rectified in rectifier 36 and applied, when switch 38 is in the upper position, to a vertical deflecting plate 56 of oscilloscope 54. The output of sweep generator 44 is, in part, applied to the horizontal deflecting plate 58 of oscilloscope 54 and the combined action of the above-described deflecting voltages will produce traces of the type shown as curves 400, 500 and 600 in Figs. 4, 5 and 6, respectively.

Curve 400 of Fig. 4 can represent, for example, the broadest spectrum of beat-note frequencies, corresponding to the maximum speed of the aircraft and the coincidence of the direction of horns 18, 20 with the actual direction of motion of the aircraft, curve 500 can represent some horn angle intermediate the actual direction of motion of the craft and the perpendicular to said direction and curve 600 can represent the most constricted beat-note frequency spectrum obtained and therefore corresponds to a horn angle of 90 degrees with respect to the actual direction of motion of the craft.

Referring again to Fig. 1, horns 18, 20 and transmitter 10 are enclosed in a housing 16 which is arranged to rotate and to which is attached beveled gear 14. Beveled gear 26 meshes with gear 14 and is carried on shaft 64 which can be rotated either by motor 62 or by handwheel 60. The right end of shaft 64 drives sine wave generator 66 which can be any conventional generator of a reasonably true sine wave voltage, or alternatively, it can preferably be of special form such as that disclosed in the copending application of H. Morrison, Serial No. 492,263, filed June 25, 1943, which issued on February 25, 1947 as U. S. Patent 2,416,341, or that disclosed in the copending application of G. B. Engelhardt, Serial No. 494,666, filed July 14, 1943, which issued June 10, 1947 as U. S. Patent 2,421,749, both of which applications relate to sine wave generating means peculiarly well adapted for use in radar indicating circuits. Generator 66, in whatever form may be chosen, should preferably provide two sine waves which are substantially identical but are in quadrature relation, or, expressed in other words, a sine wave and a cosine wave of like amplitude and frequency. Gears 14 and 26 provide a "one to one" ratio, so that the frequency of the sine wave corresponds to the rotational speed of the antennas.

Combining circuit 68 provides for modulating the sine and cosine waves of generator 66 with the saw-tooth wave of sweep generator 44. One arrangement for effecting the appropriate modulation is shown, by way of example, in United States Patent 2,313,966 granted March 16, 1943 to W. J. Poch. Conventional push-pull or balanced modulating circuits are preferably employed as shown, for example, in copending application of N. W. Bryant, Serial No. 423,757, filed December 20, 1941, now Patent No. 2,471,516, granted May 31, 1949, or, alternatively, the modulation of the sine and cosine waves can be effected by the circuits described in the above-mentioned patent of G. B. Engelhardt.

The modulated sine and cosine waves are amplified in amplifier 78 and one is applied to the horizontal deflecting plates 50 of oscilloscope 46 and the other is applied to the vertical deflecting plates 48 of oscilloscope 46 so that the ray of the oscilloscope will rotate about the center point of its screen and simultaneously will scan radially from the center to the periphery of the screen as for the so-called "plan position" type of indication, now well known in the art and disclosed, for example, in the above-mentioned applications of Bryant and Engelhardt.

When it is desired to employ the cathode ray oscilloscope 46, switch 38 is thrown to its lower position and the output of rectifier 36 is then applied to the control anode 52 of oscilloscope 46 so that as antennas 18, 20 are rotated, the radially scanning ray of oscilloscope 46 will rotate in synchronism therewith and the ray will be intensity modulated at each angle in accordance with the frequency spectrum of beat-notes obtained for that particular angle and a pattern of radial traces as 702 shown in Fig. 7 will be obtained, the brightened portions of the radii being of maximum length for the position of coincidence of the horns with the direction of actual motion 704 of the aircraft and decreasing to a minimum at the line perpendicular to the direction of actual motion 706. Normally a small open circle about the center point of the oscilloscope screen will be obtained and indicates that the frequency range of the beating oscillator is slightly more than is required to "beat" with the lowest frequency of the beat-note frequency spectrum to produce a frequency to pass through filter 34. Similarly, the brightened radial traces of maximum length should preferably not quite reach the outer periphery of the oscilloscope screen, i. e., the frequency range of beating oscillator 40 should obviously be slightly greater than required to bring both ends of the maximum beat-note frequency range upon the scale of the indicator. As mentioned above the antennas 18, 20 are preferably of a type providing a fan-shaped beam with its broad dimension in the vertical plane and are, as shown in Fig. 1, directed toward the earth at an angle of substantially 45 degrees with respect to the horizontal plane, since such an arrangement will, obviously, provide a broader range of beat-note frequencies. This follows directly from Equation 8 of the above-mentioned Patent 2,223,224 to R. C. Newhouse given at page 2, column 1, line 48, in which $\cos \theta$ appears as a factor in determining the beat-note frequency, $\theta$ representing the angle of transmission below horizontal. With a broad or fan-type beam, as above described, a spectrum of beat-note ranging in frequency between that obtaining for the value of $\theta$ corresponding to the edge of the beam nearest perpendicular and that obtaining for the value of $\theta$ corresponding to the edge of the beam nearest horizontal will, manifestly, be obtained.

The screen of oscilloscope 46 of Fig. 1, or 700 of Fig. 7, can bear marks 708 to designate fore and aft and marks 710 to designate port and starboard with respect to the heading of the craft and the angle between marks 708 and line 704 or between marks 710 and line 706 is then the "crab angle" or angle between the actual direction of motion of the craft and its heading. A scale in degrees, as illustrated to the left of screen 700 in Fig. 7, is preferably provided to facilitate reading the "crab angle." The portion of the scale below mark 710 obviously is applicable for drift angles to the left and that above mark 710 for drift angles to the right. As, in the case of the indications obtained on oscilloscope 54 and illustrated in Figs. 4, 5 and 6, the maximum length of radial trace which is brightened on the pattern of Fig. 7 is a measure of the speed of the aircraft with respect to the surface of the earth and in addition, as noted above, its direction is that of the actual direction of motion of the craft.

For an aircraft flying at a substantially constant altitude over reasonably level terrain the maximum frequency beat-note obtained on either indicator (i. e., oscilloscope 46 or 54) will be a function of speed and is therefore a direct index of the speed. A calibration scale in terms of speed can therefore, obviously, be directly associated with each of the indicators, as illustrated in Figs. 4 and 7, from which the speed can be read. The scale divisions required can be computed from the well-known equations relating to the Doppler effect given, for example, in the above-mentioned patent to R. C. Newhouse, see particularly Equation 8 given at page 2, column 1, line 48, in which the value of the angle $\theta$ for the maximum beat-note frequency is, obviously, that of the most nearly horizontal ray of the fan-shaped beam and V is the desired ground speed, or they may alternatively be arrived at by empirical methods, i. e., by flying over a measured and timed course at a substantially constant altitude and observing the maximum beat-note frequencies obtained for a number of known speeds within the range of interest. In Fig. 4, scale 402 with the associated calibration marks designated 250, 300 and 350, respectively, and accompanied by the legend Speed M. P. H. illustrate an appropriate scale for oscilloscope 54. In Fig. 7 the calibration marks 724, 722 and 720 can most conveniently take the form of circles mutually concentric about the center point of the oscilloscope. They are designated 250, 300 and 350, respectively, and accompanied by the legend Speed M. P. H., by way of illustration, for an appropriate scale for oscilloscope 46. From the above-mentioned Equation 8 of the Newhouse patent it is obvious that a calibration once established is valid for all altitudes. Disturbances in the pattern of indications obtained on oscilloscope 46 resulting from a terrain which slopes substantially or from a substantial departure from level flight by the aircraft are fortunately of definite, easily recognized, and readily interpreted character, as will be discussed below, and speed indications are, obviously, entirely valid at all times during which a normal undisturbed pattern of indications is being obtained.

Obviously, if the craft is flying in a horizontal plane and a substantial difference between the relative radial amplitudes of the fore and aft lobes of the pattern of Fig. 7 of indicator 46 or between the "port" and "starboard" portions of the lobes, is observed, it will indicate that the craft is not flying in a plane which is substantially parallel with the earth's surface. Systems of the invention will, therefore, provide indications of changes in the relation of the plane of flight with respect to the surface of the earth beneath. This may of course result either from a change in the angle of the plane of flight or from a change in angle of the terrain over which the craft is flying. Such indications will, therefore, warn the pilot when the terrain beneath has substantially changed its slope and, over mountainous terrain will provide him with indications of the general slope of the terrain beneath and will assist him in avoiding collision by drifting off his true course.

In Fig. 2, as mentioned above, saw-tooth curve 200 represents the sweep wave generated by generator 44 of Fig. 1 and employed to provide the horizontal and radial sweeps of oscilloscopes 54 and 46 of Fig. 1, respectively. Curve 202 represents, as above mentioned, the cyclic frequency variation of the beating oscillator 40 of Fig. 1, the oscillator passing through its full range of frequencies from maximum to minimum values simultaneously with the sweep voltage of generator 44, and instantaneously returning to its maximum value to repeat its frequency variation cycle in synchronism with the next sweep wave cycle.

In Fig. 3 the variable capacity unit and pulser which effects the cyclic frequency variation of the beating frequency cycle oscillator and provides a pulse at the start of each frequency cycle to synchronize the saw-tooth wave generator 44 therewith is shown and comprises a conventional type of rotary variable capacitor which includes two adjacent and opposed sets of spaced stator plates 300 with a single set of spaced rotor plates 302 arranged to interleave with the stator plates without making physical contact therewith.

Motor 306 serves to rotate shaft 304 upon which rotor 302 and cam 305 are mounted. As it rotates, cam 305 alternately forces spring 310 to the right and then permits it to travel to the left under its own spring tension for alternate halves of each revolution and contact springs 312 and 314 are thus alternately connected to terminal 332 through spring 310. Spring 310 is forced to the right by cam 305 at the moment rotor 302 passes completely out of the lower stator 300 and is permitted to return to its position at the left the moment rotor 302 has passed completely out of the upper stator 300. Terminals 332, 334 are connected to the frequency determining circuit of the beating oscillator 40 of Fig. 1 and the variable capacity of capacitor 300, 302 thus serves to vary the oscillator frequency cyclically as required by curve 202 of Fig. 2. The plates of rotor 302 are preferably shaped in accordance with principles well known in the art to provide a substantially straight-line frequency variation when associated with the frequency determining circuit of oscillator 40. Spring 310 is mechanically connected to spring 316 by member 308, which is of insulating material, so that spring 316 follows the movements of spring 310. Springs 316, 318 and 320 constitute a "make-before-break" set of contacts, that is, as spring 316 moves to the right spring 318 makes contact with spring 320 before it breaks its contact with spring 316. Similarly, when spring 316 moves back to the left from its extreme position at the right it makes contact with spring 318 before spring 318 breaks contact with spring 320. Thus, for each movement of spring 316 from its left to its right position or from its right to its left position, the circuit from terminal 328 to terminal 330, which includes battery 326, is momentarily closed and then reopened by the action of springs 316, 318 and 320. Terminals 328, 330 connect to sweep generator 44 and a pulse from battery 326 is thereby provided each time that cam 305 changes the position of springs 310 and 316. As this is the instant at which a new frequency cycle is initiated, the pulses to sweep generator 44 of Fig. 1 serve to synchronize the saw-tooth wave sweep generator with the frequency cycle. The speed of rotation of motor 306 should be large with respect to the speed of rotation of the antennas so that each sweep of the beat-note frequency spectrum will correspond with the reflections received from a small arc of the total circular area swept by a complete rotation of the antenna system.

In Figs. 4, 5 and 6, curves 400, 500 and 600, as mentioned above, represent the beat-note frequency spectrum for three typical antenna horn directions, curve 400 corresponding, for example, to the direction of actual motion of the craft, curve 500 corresponding to some oblique angle therewith and curve 600 corresponding to the perpendicular to the actual direction of motion. As noted above and as illustrated in Figs. 4 and 7, scales reading speed directly can be associated with the oscilloscope and for the direction of actual motion of the craft the speed with respect to the earth's surface can then be read directly from the scale, as illustrated at the left of oscilloscope screen 700 in Fig. 7. Likewise, a scale from which the "crab" or drift angles of the craft can be read directly is preferably provided.

In Fig. 7 the information gathered by continuously revolving the horn antennas is shown. The method and apparatus for obtaining this indication and the character of the indication have been discussed in detail above.

Numerous variations and modifications of the above arrangements can readily be made by those skilled in the art and systems employing other types of energy can be constructed without departing from the spirit and scope of the principles of the invention. By way of example, a compressional wave system for use on marine craft, obviously, could be devised in accordance with the teachings of the invention to provide speed and drift indications with respect to the "floor" of the body of water in which the craft is located. The invention is defined in the following claims.

What is claimed is:

1. The method of detecting on an aircraft that the slope of the terrain beneath the craft is changing appreciably which comprises radiating a fan type beam of energy of substantially constant frequency in all directions from said craft the broad dimension of said beam being in the vertical plane said beam being directed to strike the earth's surface obliquely, rotating said beam about a vertical axis, receiving reflections of said energy beam on said craft, combining said received reflected energy with a small portion of the energy being radiated, detecting the combined energies to obtain a spectrum of beat-note frequencies, and displaying the frequency distribution of said beat-note frequency spectrum obtained for numerous directions of radiation, whereby changes in the relative frequency distribution of said spectrums for various angles provides indications of change in the slope of the reflecting terrain.

2. An aircraft radio speed and drift indicating system comprising, in combination, means for transmitting a fan-shaped beam of radio energy of a particular predetermined frequency, the major axis of said beam being vertical, the axis of said beam being depressed from the horizontal at an oblique angle sufficient to cause the entire beam to impinge upon the earth's surface when said aircraft is proceeding parallel to said surface, means for receiving reflections of said beam from the earth's surface, means for deriving energy directly from said transmitting means, means for combining said directly derived energy and said received reflected energy to obtain beat-notes representing frequency differences between said transmitted and said received energy, means for rotating said transmitting and receiving means about a vertical axis, means for frequency analyzing the entire spectrum of beat frequencies obtained for each azimuthal direction and indicating means cooperatively coupled with said rotating means and said frequency analyzing means for visually representing the entire frequency spectrum of beat frequencies for each and every azimuthal angle.

3. A navigational aid for mobile craft adapted for use on said craft when proceeding in a substantially horizontal plane with respect to the earth's surface, said aid comprising in combination transmitting apparatus adapted to emit a fan-shaped beam of wave energy to strike the earth's surface obliquely, said wave energy having a particular predetermined frequency, the major axis of said fan-shaped beam being in the vertical plane, receiving apparatus adapted to receive reflections of said beam from the earth's surface, apparatus adapted to derive a small amount of wave energy directly from said transmitting apparatus and to combine the directly derived and the received reflected wave energy to obtain beat-notes representing apparent frequency differences between said directly derived wave energy and said received reflected energy, beat-frequency analyzing apparatus adapted to isolate each frequency of the entire spectrum of beat frequencies obtained from said combination of wave energies, means to rotate said beam in the horizontal plane and indicating apparatus adapted to visually indicate each and every beat frequency of the entire beat-frequency spectrum being obtained at each instant.

CARL B. H. FELDMAN.
JAMES W. McRAE.

REFERENCES CITED

The following references are of record in the file of this patent:

UNITED STATES PATENTS

| Number | Name | Date |
|---|---|---|
| 1,864,638 | Chilowsky | June 28, 1932 |
| 2,084,760 | Beverage | June 22, 1937 |
| 2,223,224 | Newhouse | Nov. 26, 1940 |

FOREIGN PATENTS

| Number | Country | Date |
|---|---|---|
| 497,147 | Great Britain | Dec. 9, 1938 |